(12) United States Patent
Gennissen et al.

(10) Patent No.: US 7,467,891 B2
(45) Date of Patent: Dec. 23, 2008

(54) SENSOR ARRANGEMENT FOR MEASURING A PRESSURE AND A TEMPERATURE IN A FLUID

(75) Inventors: Paulus Thomas Johannes Gennissen, Enschede (NL); Marc Gerard Johan Borgers, Enschede (NL); Arie-Jan Kolling, Enschede (NL); Cris Ruiz Zwollo, Hengelo (NL); Roger Marcel Appelo, Beilen (NL); Werner John Peter Kleissen, PV (NL)

(73) Assignee: Sensata Technologies, Inc., Attleboro, MA (US)

( * ) Notice: Subject to any disclaimer, the term of this patent is extended or adjusted under 35 U.S.C. 154(b) by 193 days.

(21) Appl. No.: 11/561,628

(22) Filed: Nov. 20, 2006

(65) Prior Publication Data

US 2007/0121701 A1    May 31, 2007

(30) Foreign Application Priority Data

Nov. 29, 2005  (EP) ................. 05111427
Nov. 14, 2006  (EP) ................. 06123975

(51) Int. Cl.
    *G01K 13/00*    (2006.01)
(52) U.S. Cl. ..................... 374/143; 374/141
(58) Field of Classification Search .......... 374/24, 374/143–145, 202, E5.011, E5.019; 73/23.25; 236/1 F; 165/246–247, 279, 280
    See application file for complete search history.

(56) References Cited

U.S. PATENT DOCUMENTS

| | | | |
|---|---|---|---|
| 3,681,990 A * | 8/1972 | Barrett et al. | 374/154 |
| 3,748,551 A * | 7/1973 | Petersen | 361/284 |
| 4,638,668 A * | 1/1987 | Leverberg et al. | 73/866.5 |
| 4,660,387 A * | 4/1987 | Usami | 62/184 |
| 4,772,132 A * | 9/1988 | Hofmann | 374/143 |
| 4,986,127 A * | 1/1991 | Shimada et al. | 73/714 |
| 5,070,706 A * | 12/1991 | Waters et al. | 62/129 |
| 5,702,592 A * | 12/1997 | Suri et al. | 210/90 |
| 5,895,861 A * | 4/1999 | Slonaker | 73/732 |
| 6,062,087 A * | 5/2000 | Vovan | 73/726 |
| 6,212,946 B1 | 4/2001 | Naegele et al. | |
| 6,592,253 B2 * | 7/2003 | Nyffenegger et al. | 374/143 |
| 6,997,607 B2 * | 2/2006 | Iwaya et al. | 374/208 |

(Continued)

FOREIGN PATENT DOCUMENTS

EP    0893676    1/1999

(Continued)

*Primary Examiner*—Edward Lefkowitz
*Assistant Examiner*—Bret Adams
(74) *Attorney, Agent, or Firm*—Russell E. Baumann (57) ABSTRACT

A sensor arrangement (1) for measuring a pressure and a temperature in a fluid is disclosed. The sensor arrangement (1) comprises a temperature sensitive electrical element (3) and a pressure sensing electrical element (6), the temperature sensitive electrical element (3) and pressure sensing electrical element (6) are both coupled to one side of a metallic membrane structure (4,16). The metallic membrane structure is arranged to pass on the temperature of the fluid which is at the other side of the membrane structure (4,16) to the temperature sensitive electrical element (3) and to pass on the pressure in the fluid to the pressure sensing electrical element (6). In this way a combined pressure and temperature sensor is obtained which is applicable in vehicle air-conditioning systems working with $CO_2$ as refrigerant.

11 Claims, 6 Drawing Sheets

U.S. PATENT DOCUMENTS

| | | | |
|---|---|---|---|
| 7,000,478 B1* | 2/2006 | Zwollo et al. | 73/708 |
| 7,168,330 B1* | 1/2007 | Nyffenegger et al. | 73/861.71 |
| 2002/0135455 A1* | 9/2002 | Murata et al. | 338/28 |
| 2002/0172259 A1* | 11/2002 | Bach | 374/208 |
| 2003/0067960 A1* | 4/2003 | Nyffenegger et al. | 374/143 |
| 2005/0185696 A1* | 8/2005 | Nakabayashi | 374/145 |
| 2006/0072643 A1* | 4/2006 | Kwon | 374/143 |

FOREIGN PATENT DOCUMENTS

| | | |
|---|---|---|
| FR | 2691802 | 12/1993 |

* cited by examiner

SENSOR ARRANGEMENT FOR MEASURING A PRESSURE AND A TEMPERATURE IN A FLUID

RELATED APPLICATIONS

Priority is claimed under European Patent Application No. 05111427.0, filed Nov. 29, 2005 and European Patent Application No. 06123975.2, filed Nov. 14, 2006.

FIELD OF THE INVENTION

The present invention relates generally to a sensor arrangement for measuring a pressure and a temperature in a fluid. The sensor arrangement comprising a temperature sensitive electrical element and a pressure sensing electrical element. The invention has particular application in vehicle air-conditioning systems working with $CO_2$ as refrigerant. The arrangement according to the invention is also suitable for use in fuel injection systems in automotive applications.

BACKGROUND OF THE INVENTION

Today's, vehicle air conditioning systems working, with the refrigerant R134a, exhibit a pressure sensor on the "high pressure side" after the compressor usually for monitoring the operating pressure and for control. If the operating pressure exceeds a given maximum pressure, a regulation intervenes, which down-regulates the operating pressure e.g. by switching the compressor off into a "normal-pressure range".

Due to various reasons $CO_2$ will be used as the refrigerant in future motor vehicle air conditioning systems. For the regulation of a "$CO_2$-Refrigerant cycle" the refrigerant pressure and additionally the refrigerant temperature are needed after the compressor as controlling signals. In "$CO_2$-Air Conditioning Systems" the refrigerant pressure and the refrigerant temperature after the compressor are physical dimensions, which should be measured independently. For the monitoring of the refrigerant pressure and the refrigerant temperature one can plan a pressure sensor and additionally a temperature sensor. The use of two separate sensors is unfavorable as they have to be mounted separately to the air conditioning system in separate housings, which can lead to additional leakage problems.

An arrangement for measuring a pressure and a temperature is disclosed in U.S. Pat. No. 6,212,946 B1. The pressure sensor and the temperature sensor are secured in a common housing. In order to introduce a fluid that is under pressure, a neck part is secured to the housing and an adapter is joined both to a substrate and to the neck part via adhesive seals that decouple mechanical stress from the pressure and temperature detectors.

Furthermore a sensor arrangement for measuring a pressure and a temperature is disclosed in FR 2691802. The sensor arrangement has a body with a leak-proof tube attached to it. Inside the tube is a temperature probe or thermocouple with a cable to external electronics. On top of the body is a protective cap. The protective cap encompasses a compartment comprising a pressure transducer and associated electronics. Holes in the body allow fluid to pass to the pressure transducer.

This kind of sensor arrangements for detecting the pressure and temperature in a fluid are very complicated to produce. Furthermore, in an air-conditioning system using a $CO_2$ stream, the sensor arrangement needs to be able to measure pressures up to 200 bar and temperatures in a range of $-40°$ C. to $+180°$ C. In such systems the sensor arrangement should be fully hermetic. With elastic and adhesive materials such as elastomers it is nearly impossible to seal $CO_2$ reliably.

In fuel injections systems, the viscosity of the fuel to be injected is dependent of the temperature of the fuel. If the temperature increases, the viscosity will decrease. Consequently, with the same pressure, more fuel will be injected. This is an undesired effect that has to be compensated. To enable a controller to inject the required amount of fuel, there is a need to have a combined temperature pressure sensor, which is able to measure simultaneously temperature and pressures up to 250 Bar and higher.

SUMMARY OF THE INVENTION

It is an object of the present invention to provide a combined temperature and pressure sensing arrangement which can be used with high temperature ranges, for example, $-40°$ C. to $+180°$ C. and which is fully hermetic. Another object of the present invention is the provision of a combined temperature and pressure sensing arrangement having good dynamic response, both fast and accurate.

According to the present invention, the sensor arrangement comprises a temperature sensitive electrical element and a pressure sensing electrical element, the temperature sensitive electrical element and pressure sensing electrical element being both coupled to one side of a metallic membrane structure, wherein the membrane structure is arranged to pass on the temperature of the fluid which is at the other side of the membrane structure, to the temperature sensitive electrical element and to transfer the pressure in the fluid to the pressure sensing electrical element.

This feature allows combining the pressure and temperature sensor and enables to reduce the size of the sensor arrangement. The pressure acting on one side of the membrane is transformed into a strain at the other side of the membrane. This strain is translated into an electrical output in the pressure sensing electrical element of the sensor arrangement. Metal is very suitable to conduct heat. A metallic membrane will conduct very easily the temperature to the temperature sensitive electrical element. Furthermore, using one metallic membrane to pass on both temperature and pressure reduces the possibility of leakage. A further advantage of the membrane structure of the invention is that no glue, rubber or glass has to be used to join the respective parts of the sensor which have a contact area with the fluid. Normally, said materials could be peeled off or cause wear in the construction. Another advantage of having the electrical element at one side of the membrane structure is the protection of the temperature sensitive element against the high pressure changes in the fluid, which enlarges the lifetime of the temperature sensitive electrical element.

In a further embodiment of the invention the membrane structure comprises an elongated body, at a closed end of the elongated body is located the temperature sensitive electrical element and close to an open end is located the pressure sensing electrical element.

Using said feature allows reducing the influence of the temperature of the fluid on the operating conditions of the pressure sensing electrical element and the operating temperature of the electronics mounted in the vicinity of the pressure sensing electrical element. Furthermore, the elongated body allows to reduce the thermal mass and the thermal resistance of the membrane for the temperature sensitive electrical element. This feature enables the engineer practicing the invention to measure accurately the temperature of the fluid.

In an embodiment of the invention the membrane structure includes a pressure sensitive membrane and the pressure sensing electrical element is mounted on the pressure sensitive membrane.

The pressure sensitive structure allows to transform efficiently the pressure in the fluid acting on one side on the membrane structure to a strain at the other side of the membrane structure. The strain is measured by the pressure sensing electrical element mounted at the other side of the membrane structure.

In an embodiment of the invention the pressure sensitive structure is circular and comprises a hole in the centre, and the open end of elongated body is hermetically connected to the pressure sensitive structure to seal the hole.

These features allow to produce the sensor arrangement efficiently. The elongated body and the pressure sensitive structure could first be fastened. The hole in the pressure sensitive structure enables the engineer practicing the invention to position the temperature sensitive electrical element in the elongated body after fastening together the elongated body and the pressure sensitive structure. Furthermore, after positioning the temperature sensitive electrical element in the elongated body, the electrical wires which connect the temperature sensitive electrical element to the electronic circuitry, can freely pass the pressure sensitive structure. In this way, the presence of temperature sensitive electrical on the membrane structure does not affect the performance of the pressure measurement.

In an embodiment of the invention the sensor arrangement comprises at least two pressure sensing electrical elements, wherein the at least two pressure sensing electrical elements be symmetrically divided around the hole of the pressure sensitive structure.

These features allow to reduce the effect of the flow of the fluid along the elongated body on the pressure measurement. The lateral movement of the closed end of the elongated body will result in an increased strain at the surface of the pressure sensitive structure at one side of the hole and a decreased strain at the surface of the pressure sensitive structure at the opposite side of the hole in the pressure sensitive structure. By dividing the strain gauges equally around the hole in the pressure sensitive structure, the increased strain and decreased strain at the outer side of the pressure sensitive structure could be measured simultaneously which allows to compensate in the electronic circuitry the effect in the pressure measurement due to the lateral movement of the closed end of the elongated body.

In an embodiment of the invention the temperature sensitive electrical element is coupled to the membrane structure by means of a thermal conductive compound, like a gel. This feature allows to have a good thermal coupling of the temperature sensitive electrical element with the membrane structure. Furthermore, the compound in the form of a gel allows the temperature sensitive electrical element to have some movement with respect to the membrane structure. Variations of the pressure in the fluid will result in an axial movement of the temperature sensitive electrical element. If the temperature sensitive electrical element is firmly fixed to the membrane, the wires could be tensioned. Said tension influences pressure measurements. The gel significantly reduces the tension in the wires. Furthermore, the gel has the advantage that the effect of environmental vibrations on the temperature sensitive electrical element will be dampened, which increases the lifetime of the sensor arrangement.

In an embodiment of the invention a first part of a common body surrounds lengthwise at least partially the elongated body of the metallic membrane structure. In a further embodiment of the invention the sensor arrangement further comprises a sealing member, the sealing member being present between the first part of the common body and the elongated body. These features allows to improve the thermal isolation between pressure sensing electrical element, electronic circuitry in the housing and the fluid. By means of the seal contact of the fluid with the pressure sensitive structure is avoided, which improves further the thermal isolation.

In a further embodiment of the invention the metallic membrane structure has a coaxial structure. Using coaxial elements allows low cost production of said elements. A further advantage is that the hole to mount the sensor arrangement can be small.

BRIEF DESCRIPTION OF THE DRAWINGS

The present invention will be discussed in more detail below, using exemplary embodiments, with reference to the attached drawings, in which.

DETAILED DESCRIPTION OF EXEMPLARY EMBODIMENTS

Figure 1:
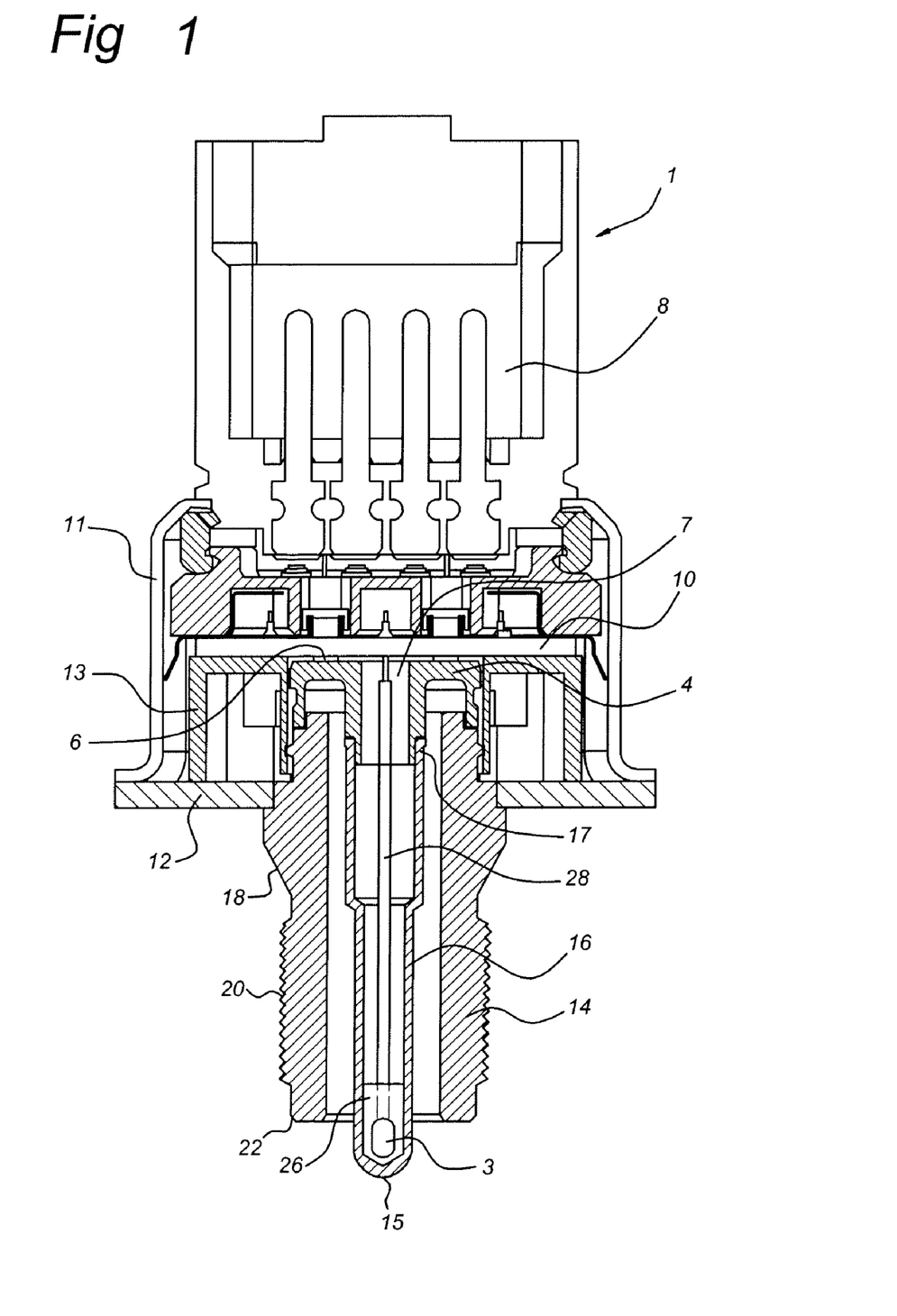
FIG. 1 shows a sectional view of a first embodiment of a sensor arrangement according to the present invention.
Figure 6:
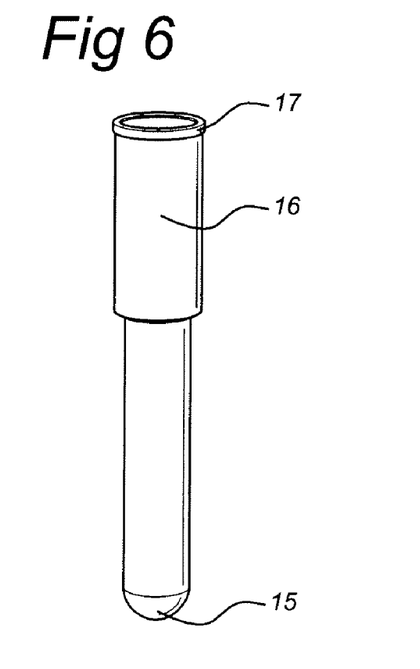
FIG. 6 shows a perspective view of the elongated body.

FIG. 1 illustrates a sectional view of a first embodiment of a sensor arrangement according to the present invention. The sensor arrangement 1 comprises a membrane structure 4, 16 both arranged in a common body 11, 12, 14. The membrane structure 4,16 includes an elongated body 16 and a pressure sensitive structure 4. The elongated body could be in the form of a metal tube, which is hermetically closed at one end. A temperature sensitive electrical element 3 is located at a closed end 15 of the elongated body 16. FIG. 6 shows a perspective view of the elongated body 16.

The temperature sensitive electrical element 3 could be any suitable Resistance Temperature Detectors (RTD), thermo couple or thermistor such as an NTC resistor. In order to measure accurately the temperature of the fluid, the closed end 15 of the elongated body 16 surrounding the temperature sensitive electrical element 3 should be immersed in the fluid to create a direct contact area with the fluid. Preferably, the closed end 15 protrudes out of a threaded pipe 14 of the common body 11, 12, 14, to enable accurate temperature measurement in a fluid flow. The fluid could be in the form of a gas or a liquid.

The temperature sensitive electrical element is coupled to the elongated body by means of a gel 26. The gel 26 is thermal conductive and ensures a fast transfer of the temperature from the elongated body 16 to the temperature sensitive electrical element 3. Furthermore, the gel dampens environmental vibrations which could damage the temperature sensitive element 3. The gel is electrically non-conductive. During manufacturing the gel has a viscosity sufficiently to flow to the closed end 15 of the elongated body 16 and to position the temperature sensitive electrical element 3 in the elongated body 16. After some time, the viscosity of the gel is increased such that the gel will stay under normal operating conditions at the closed end 15 of the elongated body 16. Instead of gel, a paste could be used to position the temperature sensitive electrical element 3 at the end 15 of the elongated body 16.

By means of the wires 28 is the temperature sensitive electrical element 3 flexible suspended in the elongated body 16. In this way is prevented that the temperature part of the sensor will affect the pressure measurement, as axial movement of the elongated body 16 will be converted into a strain at a surface of the pressure sensitive structure 4. The wires 28 should be strong enough to position the temperature sensitive electrical element in position in the gel 26 at the closed end 15 of the elongated body 16.

If necessary due to huge vibrations, the wires 28 could also be surrounded by the gel 26. Furthermore, the gel reduces the force acting on the solder connection at the printed circuit board of electronic circuitry 10 in the sensor arrangement 1.

The open end 17 of the elongated body 16 is hermetically connected to a pressure sensitive structure 4. The pressure sensitive structure 4 has a hole 7 in the center, to allow placement of the temperature sensitive electrical element 3 in the elongated body 16. A hermetical connection could be obtained by welding together the pressure sensitive structure 4 and elongated body 16. It should be noted that the membrane structure 4, 16 could also be obtained by means of one piece of material. Metal injection molding could be used to obtain a one piece membrane structure 4, 16. A membrane structure made by means of metal injection molding could have almost any form and should not necessarily be coaxial. The design of the membrane structure depends on the application of the sensor arrangement 1 and the associated temperature ranges and pressure ranges. In an air conditioning system with $CO_2$ as a refrigerant, a very suitable material is stainless steel. The elongated body 16 and flange 12 could be made of stainless steel, e.g. AISI 304.

A pressure sensing electrical element 6 is coupled to the pressure sensitive structure 4. The pressure sensing electrical element 6 could be in the form of strain gauges, which are located on the pressure sensitive structure 4. The strain gauges measure the pressure dependent strain at a surface of the pressure sensitive structure 4. It has been found that the metal 17-4 PH has a similar coefficient of expansion as the strain gauges. The relatively large operating temperature range in an air conditioning system with $CO_2$ as refrigerant makes the use of 17-4 PH very suitable. 17-4 PH is a precipitation hardening stainless steel with high strength and hardness, excellent corrosion resistance and easy heat treatment.

The net force on the membrane structure 4, 16 is generated by the pressure of the fluid acting on one side of the membrane structure 4, 16. The net force is the sum of the force acting on the pressure sensitive structure 4 and the outside of the elongated body 16. The pressure of the fluid is exerted upon the elongated body 16 such that the elongated body is axially displaced and causes deformation of the pressure sensitive structure 4. The deformation results in stress of the pressure sensing electrical element 6, which causes a signal change that can be detected and evaluated by an electronic circuitry 10 that could be present in the common body 11, 12, 14. In an embodiment, the pressure sensing electrical element 6 is a piezoresistive element. The advantages of piezoresistive elements are the relative low costs, the accuracy and the stability of the piezoresistive material. The electronic circuitry 10 is arranged to compensate and to amplify the piezoresistive signal generated by the pressure sensing electrical element 6 and to supply an output signal to a connector 8. The connector could comprise a 5 pin, 4 pin interface, a 3 pin analog interface or a 3 pin digital interface, like the Local Interconnect Network (LIN) interface (not shown).

A support ring 13 is positioned between the electronic circuitry 10 and flange 12 of the common body 11, 12, 14. The support ring 13 ensures that the electronic circuitry 10 will not have mechanical contact with the pressure sensitive structure 4 and the movements of the pressure sensitive structure 4 due to the pressure variation in the fluid will not be hampered.

The common body 11, 12, 14 includes a first body part, a housing 11 and the flange 12 and a second body part 14. The first body part 11, 12 encompasses the pressure sensitive structure 4, pressure sensing electrical element 6, electronic circuitry 10 and connections 28 of the temperature sensitive electrical element 3. The second body part 14 encompasses at least partially the elongated body 16. The second body part 14 comprises a thread 20 to mount the sensor arrangement 1 on a system (not shown). Preferably, the second body part 14, elongated body 16 and pressure sensitive structure 4 are coaxially symmetrical elements.

The sensor arrangement according to the invention is especially suitable for air conditioning system using $CO_2$ as a refrigerant. In these systems the sensor needs to be able to measure pressures up to 200 bar or higher and temperatures from −40° C. up to +180° C. Furthermore the sensor arrangement is suitable for fuel injection systems such as GDI and common rail systems, which applications need a sensor to measure pressure up to 350, 2000 bar respectively. The elongated body 16 ensures that the temperature sensitive electrical element 3 and the pressure sensing electrical element 6 with corresponding electronic circuits 10 are thermally separated from each other. The first body part 12 is located in ambient temperature. The second body part 14, which is thermally connected to a body of the air conditioning system will have a temperature between the ambient temperature and the temperature of the fluid. The closed end 15 of the elongated body 16 protruding the second body part 14 has a temperature corresponding to the fluid. Between the closed end 15 and the pressure sensitive structure 4, the temperature gradually changes from the temperature of the fluid to the temperature of the pressure sensitive structure 4, which temperature will be near to the temperature at the outer side of system. In this way the pressure sensing electrical element 6 and the electronic circuitry 10 are located away from the fluid in a less extreme temperature environment.

The thickness of the elongated body 16 should be sufficient to resist the pressure in the fluid. The thermal mass of the closed end 15 of the elongated body 16, including the temperature sensitive electrical element 3 and gel 26 is much smaller than the thermal mass of the pressure sensitive structure 4 of the membrane structure 4, 16. The relative small thermal mass of the closed end 15 of the elongated body 16, including the temperature sensitive electrical element allows following temperature changes of the fluid rapidly.

To ensure a $CO_2$ hermetical seal via the second body part 14 and membrane structure 4, 16, those parts have been hermetically connected. To ensure a $CO_2$ hermetical seal between the sensor arrangement and the air conditioning system, the second body part 14 includes a high pressure seal area 18. The high pressure seal area 18 could be in the form of a conical part. In the event the sensor arrangement is applied in a dirty environment, the high pressure seal area 18 could be located at the other side 22 of a thread 20. This reduces the risk that pollution will reach the conical connection and affect negatively the quality of the seal. Other possible seals could be obtained by a biting edge or a soft metal washer. A high pressure seal at the other side 22 of the thread 20 has an advantage over a high pressure seal 18 near to the pressure sensitive structure. With a high pressure seal at the other side 22, the possibility that mounting forces on the high pressure seal will affect the output signal of the pressure sensing electrical element 6 reduces significantly.

Figure 2:
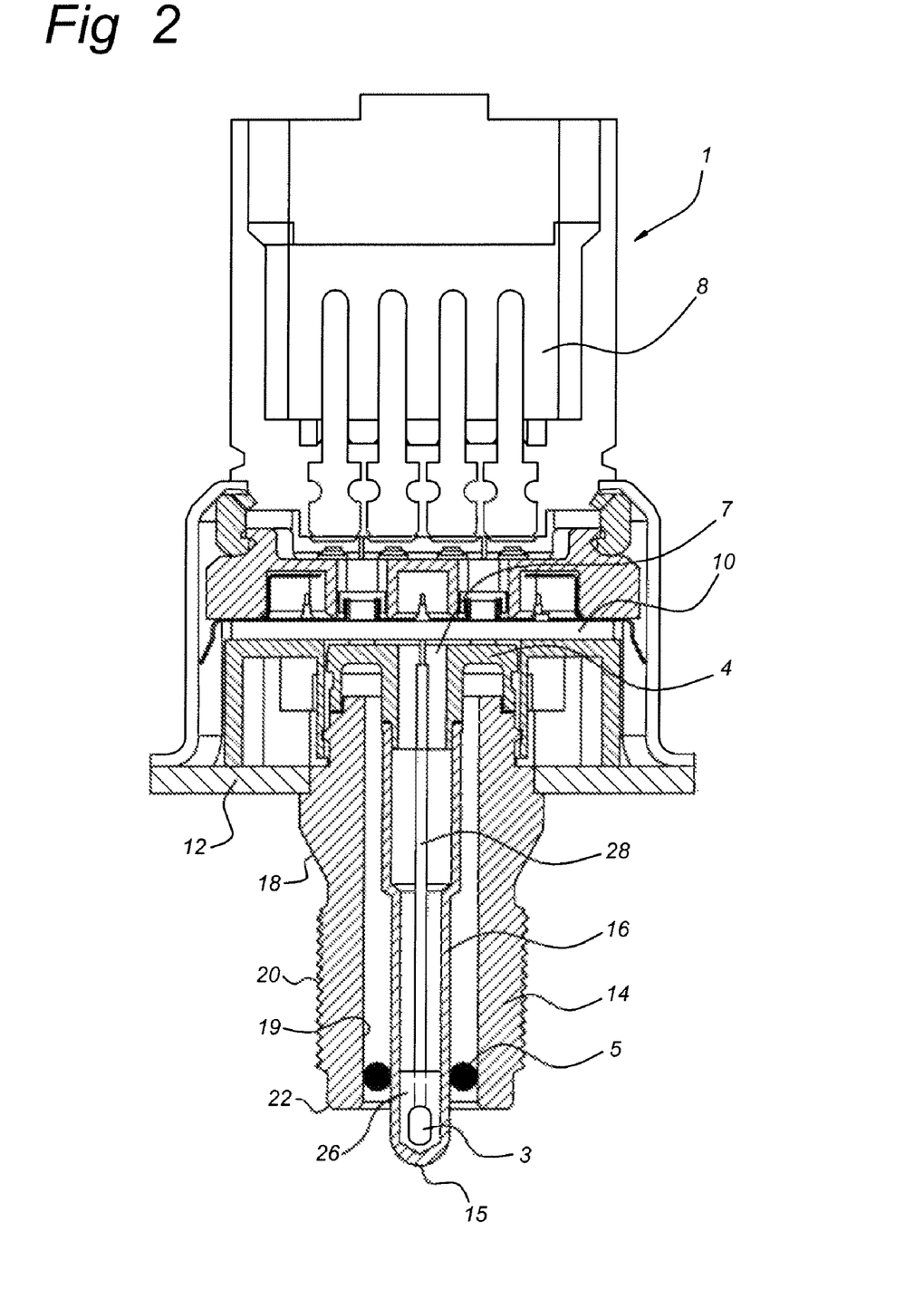
FIG. 2 shows a sectional view of a second embodiment of a sensor arrangement according to the present invention.

FIG. 2 illustrates a sectional view of a second embodiment of a sensor arrangement 1 according to the present invention. The second embodiment has a similar structure as the first embodiment. In this embodiment a sealing member 5, like an O-ring, is placed between the interior wall 19 of the second body part 14 and the elongated body 16. The sealing member 5 isolates the membrane 4 from the fluid. Next to the physical isolation, the sealing member 5 improves the thermal isolation between the electronic circuitry 10 and the fluid. In this embodiment the total force acting on the pressure sensitive structure 4 is generated by the pressure acting on the closed end 15 of the elongated body 16 and the force that is acting on the sealing member 5, which is transferred to the membrane structure 4 via the elongated body 16. This total force is transformed in a movement of elongated body 16 and an inner part of the pressure sensitive structure 4. This movement is translated into strain at a surface of the pressure sensitive structure 4, which influences the electrical property of the pressure sensing electrical element 6 of the sensor arrangement. Other embodiments of a sealing member 5 could be a metal membrane or a metal bellows seal.

Figure 3:
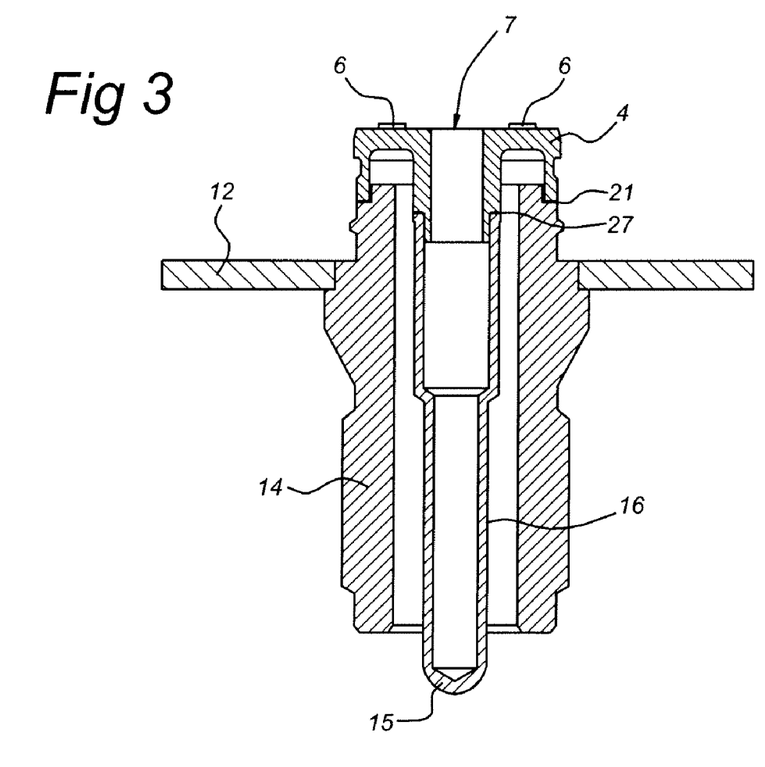
FIG. 3 shows a sectional view of the membrane structure

FIG. 3 shows a sectional view of the membrane structure 4, 16, the second body part 14 and flange 12. Pressure sensing elements 6 have been attached at a surface of the pressure sensitive structure 4. To obtain a sensor arrangement which acts as a hermetical seal, the joint 21 between the second body part 14 and pressure sensitive structure 4 must be hermetical and the joint 27 between the pressure sensitive structure 4 and the open end 17 of the elongated body 16 must be hermetical. A hermetical joint could be obtained by welding. The hole 7 in the centre of the pressure sensitive structure 4 and the cavity in the elongated body enables to position the temperature sensitive electrical element 3 after joining the elongated body 16 and the pressure sensitive structure 4.

Figure 4:
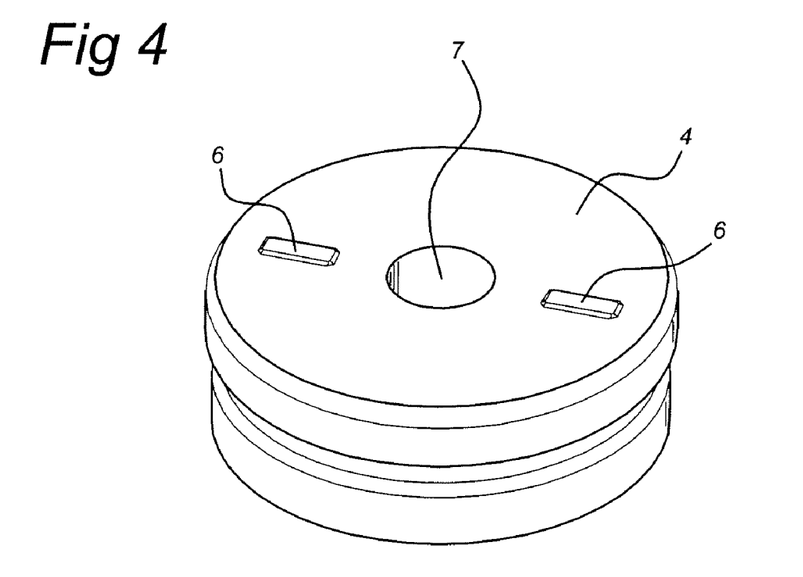
FIG. 4 shows a perspective top view of the pressure sensitive structure.
Figure 5:
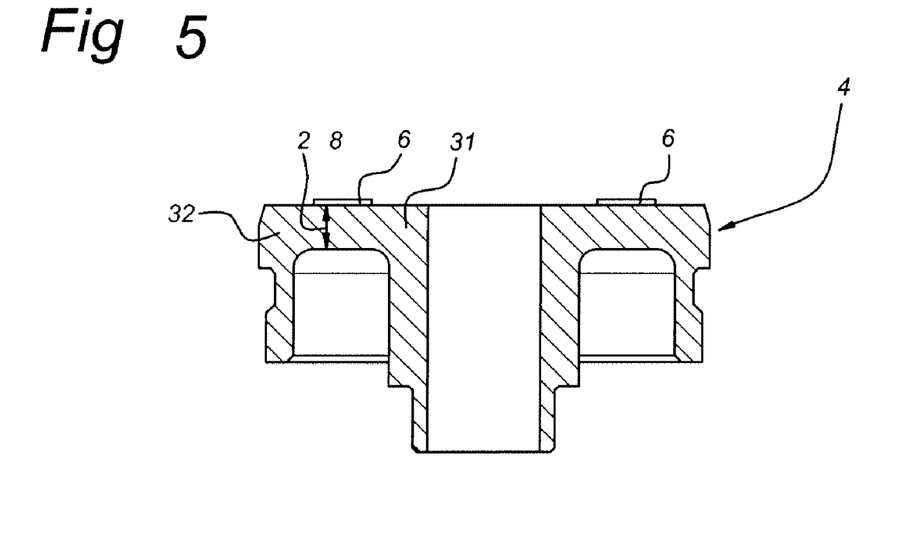
FIG. 5 shows a sectional view of the pressure sensitive structure.

FIG. 4 shows a perspective top view of the pressure sensitive structure 4. The hole 7 is in the centre of the pressure sensitive structure 4. Furthermore, two pressure sensing electrical elements 6 are mounted on the surface of the pressure sensitive structure 4. Each pressure sensing electrical element 6 in the present embodiment comprises two strain gauges. Only one pressure sensing electrical element 6 could be used to reduce production costs. In this case the two strain gauges are used in a half Wheatstone bridge. Two pressure sensing electrical elements 6 each comprising a pair of strain gauges could be used in a full Wheatstone bridge. Usage of two or more pressure sensing electrical elements 6, with two strain gauges, has the advantage that the effect of lateral movements of the closed end 15 of the elongated body 16 in the pressure measurement could be reduced when the pressure sensing electrical elements be equally divided around the hole 7. If the pressure sensing electrical elements 6 are divided equally around the hole 7, the strain at the surface due to forces caused by the lateral movement of the closed end 15, in the pressure sensitive structure 4 at one side of the hole is opposite of the strain at the surface at the opposite side of the hole. This effect could be used in the design of the electronic circuitry connected to the strain gauges to compensate the lateral movements of the closed end 15 of the elongated body 16. FIG. 5 shows a sectional view of the pressure sensitive structure 4.

An inner part 31 of the pressure sensitive structure is located near to the hole 7. A pressure acting on the membrane structure 4,16 will axially move the inner part 31 with respect to an outer part 32 of the pressure sensitive structure 4. In principle one type of pressure sensitive structure could be used for different applications with different operating pressure ranges. However, similar pressure sensing electronic elements and electronic this would result in different output ranges for the different application. Furthermore, in application with a relative low maximum pressure, this would result in unfavorable accuracy. This could be solved by selecting the thickness 28 of the pressure sensitive structure 4 such that for any application only one type of electronic circuitry and standard strain gauges could be used to generate similar accuracy and output signal range.

Figure 7:
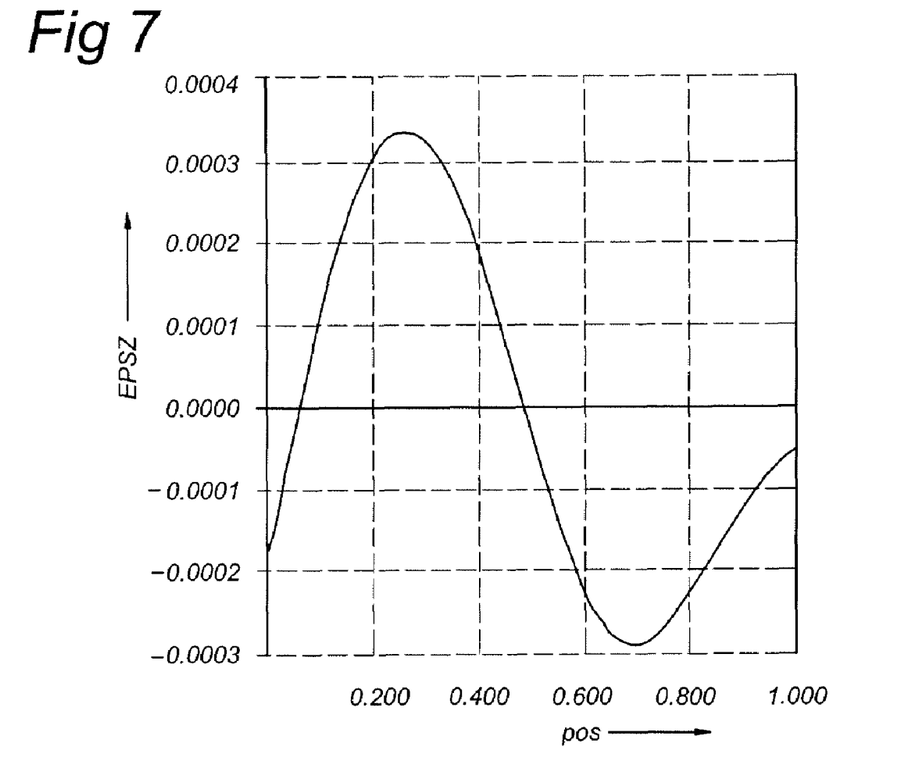
FIG. 7 shows a graph of the strain at the outer side of the pressure sensitive structure.
Figure 8:
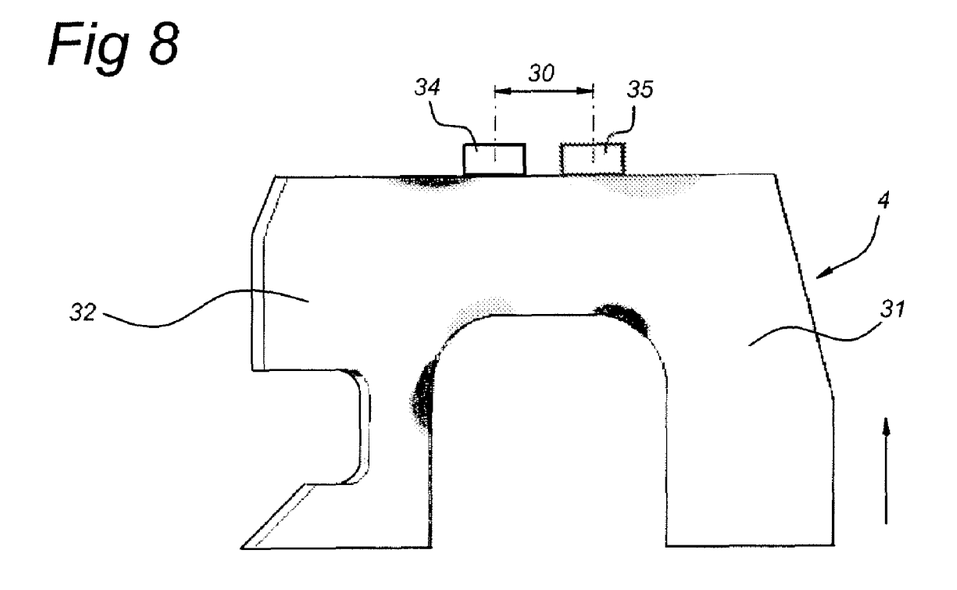
FIG. 8 illustrates a sectional view of the strain in the pressure sensitive structure.

FIG. 7 shows a graph of the radial strain course at the upper side of the pressure sensitive structure 4. The x-axis pos represents the radial position at the surface of the pressure sensitive structure 4 and the y-axis EPSZ represent the strain at said position. FIG. 8 illustrates in a sectional view of the pressure sensitive structure the strain in the pressure sensitive structure 4. An increase of the pressure in the fluid will force the inner part 31 of the pressure sensitive structure 4 to move upwards with respect to the outer part 32 of the pressure sensitive structure 4. This movement will cause compressive strain of the outer placed strain gauge 34 and tensile strain of the inner placed strain gauge 35. The distance between the strain gauges 34 and 35 is such that optimal benefit can be made from the simultaneous compression and tension of the surface. The gray areas in the pressure sensitive structure 4 indicate the areas with appreciable strain. The strain gauges 34, 35 in FIG. 8 form together one pressure sensing electrical element 6. Each of the strain gauges 34, 35 comprises only one resistor.

Figure 9:
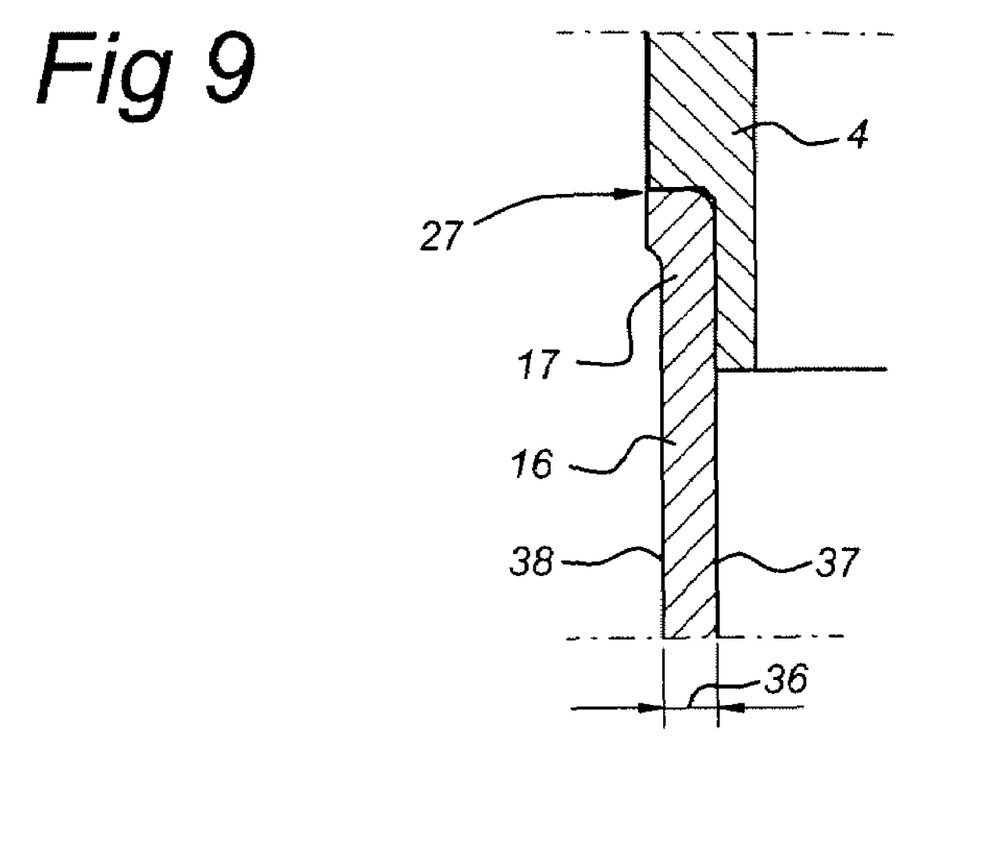
FIG. 9 shows a sectional view of an embodiment of a joint between the pressure sensitive structure and the elongated body.

FIG. 9 shows a sectional view of an embodiment of a joint between the pressure sensitive structure 4 and the elongated body 16. The thickness 36 of the elongate body 16 depends on the accuracy of the welding device and the pressure difference between the outer side 38 and inner side 37 of the elongated body 16. The thickness 36 should be sufficient to sustain the pressure forces and to allow to make a hermetic joint. The thickness 36 of the elongated body 16 should be as thin as possible to reduce the thermal mass. In an embodiment the thickness is 0.5 mm, which is suitable to resist pressures up to 170 Bar, ensure a response time of the temperature sensitive element that is smaller than 10 seconds and a temperature accuracy smaller than 3° C.

Several embodiments of the invention have been described above by way of exemplary embodiments. Various modifications and variations for the elements described with respect of these embodiments may be made by the skilled person without departing from the scope of the present invention, which is defined by the appended claims. For example, the sensor arrangement could be a combined pressure and flow sensor. In stead of measuring the deformation of the membrane by means of a pressure sensing electrical element 6 in the form of strain gauges, the deformation could be measured capacitive, magnetically or optically. For example the axial movement of the elongated body 16 or inner part 31 of the pressure sensitive structure 4 when a pressure is applied, could be measured by a pressure sensing electrical element 6 comprising a piezoelectric transformer.

The invention claimed is:

1. A sensor arrangement (1) for measuring a pressure and a temperature in a fluid, the sensor arrangement (1) comprising a common body (11, 12, 14), a membrane structure (4, 16), a temperature sensitive electrical element (3) and a pressure sensing electrical element (6), the temperature sensitive electrical element (3) and pressure sensing electrical element (6) are both coupled to one side of the membrane structure (4, 16), wherein the membrane structure (4, 16) comprises an elongated body (16), at a closed end (15) of the elongated body is located the temperature sensitive electrical element (3) and close to an open end (17) is located the pressure sensing electrical element (6). wherein an axial movement of the elongated body (16) influences an electrical property of the pressure sensing electrical element (6).

2. A sensor arrangement according to claim 1, wherein the membrane structure (4, 16) includes a pressure sensitive structure (4) and the pressure sensing electrical element (6) is mounted on the pressure sensitive structure (4).

3. A sensor arrangement according to claim 2, wherein the pressure sensitive structure (4) comprises an inner part (31) and an outer part (32), wherein a pressure acting on a membrane structure (4, 16) will axially move the inner part (31) with respect to the outer part (32) of the pressure sensitive structure (4).

4. A sensor arrangement according to claim 2, wherein the pressure sensitive structure (4) is circular and comprises a hole (7) in the centre, and the open end (17) of elongated body (16) is hermetically connected to the pressure sensitive structure (4) to seal the hole (7).

5. A sensor arrangement according to claim 4, wherein the arrangement comprises at least two pressure sensing electrical elements (6), wherein the at least two pressure sensing electrical elements (6) be symmetrically divided around the hole (7) of the pressure sensitive structure (4).

6. A sensor arrangement according to claim 1, wherein the temperature sensitive electrical element (3) is coupled to the membrane structure 4,16) by means of a thermal conductive compound (26).

7. A sensor arrangement according to claim 1, wherein a first part (14) of a common body (11, 12, 14) surrounds lengthwise at least partially the elongated body (16) of the membrane structure (4, 16).

8. A sensor arrangement according to claim 7, wherein the sensor arrangement further comprises a sealing member (5), the sealing member (5) being present between the first part (14) of the common body (11, 12, 14) and the elongated body (16).

9. A sensor arrangement according to claim 1 wherein the membrane structure (4, 16) has a coaxial structure.

10. A sensor arrangement according to claim 1 wherein the fluid is a gas.

11. A sensor arrangement according to claim 1 wherein the fluid is a $CO_2$-stream.

* * * * *